(12) United States Patent
Ishikawa

(10) Patent No.: US 6,349,080 B1
(45) Date of Patent: Feb. 19, 2002

(54) METHOD AND APPARATUS FOR EFFICIENT READING OF DATA FROM DISC RECORD MEDIUM BY SELECTING READING ORDER OF DATA UNITS

(75) Inventor: Akio Ishikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/246,627

(22) Filed: Feb. 8, 1999

(30) Foreign Application Priority Data

Feb. 9, 1998 (JP) .......................................... 10-027583

(51) Int. Cl.[7] ................................................. G11B 7/00
(52) U.S. Cl. ...................................... 369/44.28; 369/32
(58) Field of Search ....................... 369/321, 94, 124.1, 369/44.28, 44.27, 44.26, 275.3, 44.34, 47.31, 47.33, 47.54, 53.25, 53.37; 711/167, 169, 112, 114

(56) References Cited

U.S. PATENT DOCUMENTS

| | | | |
|---|---|---|---|
| 4,930,114 A | * 5/1990 | Tateishi | 369/32 |
| 5,781,516 A | * 7/1998 | Yamada | 369/32 |
| 5,875,161 A | * 2/1999 | Takegawa | 369/44.28 |
| 6,128,256 A | * 10/2000 | Inoue et al. | 369/32 |
| 6,138,221 A | * 10/2000 | Korst et al. | 711/167 |

* cited by examiner

*Primary Examiner*—David Hudspeth
*Assistant Examiner*—Kim-Kwok Chu
(74) *Attorney, Agent, or Firm*—Frommer Lawrence & Haug LLP; William S. Frommer; Glenn F. Savit

(57) ABSTRACT

A data reading apparatus and a data reading method are disclosed which are structured to efficiently read data from a recording medium so as to improve data processing speed. A reading-order control circuit obtains first total jump time which is taken when data is read from an optical disc in an order as first, second, third and fourth files and second total jump time which is taken when data is read in an order as first, third, second and fourth files. The reading-order control circuit determines whether or not the first total jump time is longer than the second total jump time. If the reading-order control circuit determines that the first total jump time is longer than the second total jump time, the reading-order control circuit controls an optical head to read data from the optical disc in the order as the first, third, second and the fourth files.

6 Claims, 7 Drawing Sheets

METHOD AND APPARATUS FOR EFFICIENT READING OF DATA FROM DISC RECORD MEDIUM BY SELECTING READING ORDER OF DATA UNITS

BACKGROUND OF THE INVENTION

1. Field of the Invention

The present invention relates to a data reading apparatus for efficiently reading data recorded on a disc type recording medium, such as an optical disc or a magnetic disc, and a data reading method.

2. Related Background Art

Hitherto, data compressed and encoded by, for example, MPEG (Moving Picture Experts Group), is recorded on a recording medium, such as an optical disc. An apparatus for reproducing an optical disc incorporates an optical head for reading data from the optical disc; a decoding circuit for decoding read data; a buffer memory in which data supplied from the decoding circuit is stored; and a controller for controlling the operation of the optical head for reading data and that for reading data from the buffer memory. Since an amount of data which must be decoded varies depending on the compression ratio of data recorded on the optical disc, the decoding circuit cannot output data at a predetermined rate. Therefore, the apparatus for reproducing an optical disc has a buffer memory for absorbing variation in the input/output rate.

Input rate Rin set to the buffer memory is the same as an amount of data per unit time when data is being read from the optical disc, as shown in FIG. 1. When the optical head is being moved on the optical disc, the input rate Rin is zero. The foregoing period of time corresponds to jump time. Although the input rate Rin is a constant value or variable value at a lowest rate, the average input rate is made to be a constant value.

Output rate Rout set to the buffer memory indicates an amount of data per unit time which is output from the buffer memory, as shown in FIG. 2. That is, the output rate Rout is a constant value.

As shown in FIG. 3, data obtained by time-integrating input/output rate Rin–Rout which is a result of subtraction of the output rate Rout from the input rate Rin is accumulated in the buffer memory. When the input rate Rin>0, the input rate Rin is always higher than the output rate Rout. Therefore, the input/output rate Rin–Rout takes positive values, causing a graph ascending to the right to be formed. If the input rate Rin=0, a graph descending to the right is formed.

Since the capacity of the buffer memory is a finite value, exhaustion of data (underflow) occurs when the amount of data accumulated in the buffer memory is made to be zero. At this time, a constant value of the output rate Rout cannot be maintained. If data is accumulated in the buffer memory to a limit of the capacity of the buffer memory, the optical head cannot read data from the optical disc. In this case, formation of an available storage region in the buffer memory in which data can be accumulated must be waited for. At this time, a kickback operation is performed. The kickback operation is an operation for interrupting reading of data from the optical disc until the available capacity is formed in the buffer memory. Moreover, an operation for reading data from the optical disc is performed after the available capacity has been created.

If a plurality of data units are discretely recorded on the optical disc, the controller must cause the optical head to jump over tracks to read each file when the data unit are read. If a trackjump is performed, data is not read in this period of time. Thus, a data processing operation or the like is delayed. Therefore, shortening of time for which the jump over tracks is completed has been required.

Since reading of data from the optical disc must intermittently be limited during the kickback operation, there arises a problem in that a long time is required to complete the data reading process.

SUMMARY OF THE INVENTION

In view of the foregoing, an object of the present invention is to provide a data reading apparatus and a data reading method which are capable of efficiently reading data from a recording medium so as to raise data processing speed.

To achieve the above-mentioned object, according to one aspect of the present invention, there is provided a data reading apparatus including: reading means for reading a plurality of data units recorded on a disc-shape recording medium; storage means for storing the data units read by the reading means; and control means for calculating track jump time which is taken when the reading means reads the data units in accordance with permutations of the data units which can be combined, selecting a permutation of the data units with which the track jump time can be made shortest and controlling the reading means to read the plural data units in accordance with the selected permutation.

The data reading apparatus calculates track jump time when the reading means reads files in permutations of the files which can be combined. A permutation of the files with which the track jump time can be made shortest is selected. The reading means is controlled to read the plural files in accordance with the selected permutation of the files. The data units may be record data units, such as ECC block sectors, files, program units, a plurality of record data units or a plurality of program units, which are recorded on a disc-shape recording medium.

According to another aspect of the present invention, there is provided a data reading method such that a plurality of data units recorded on a disc-shape recording medium are read by reading means, the data reading method including the steps of:

storing data units read by the reading means; controlling the storage means such that the stored data units are read in a predetermined order; calculating track jump time which is taken when the reading means reads the data units in accordance with permutations of the data unit which can be combined; selecting a permutation with which the track jump time can be made shortest; and controlling the reading means to read the plural data units in accordance with the selected permutation.

The data reading method according to the present invention is arranged to calculate track jump time when the reading means reads the data units in accordance with permutations of the data units which can be combined. A permutation of the data units with which the track jump time can be made shortest is selected. The reading means is controlled to read the plural data units in accordance with the selected permutation.

The data units may be record data units, such as ECC block sectors, files, program units, a plurality of record data units or a plurality of program units, which are recorded on a disc-shape recording medium.

According to another aspect of the present invention, there is provided a data reading apparatus including: reading means for reading a plurality of data units recorded on a disc-shape recording medium; storage means for storing the data units supplied from the reading means at a predetermined rate; and control means for switching a first operation mode for intermittently limiting reading of the data units which is performed by the reading means when an amount of data has been enlarged to a limit of the capacity of the storage means when the reading means is reading a first data unit and a second operation mode for controlling the reading means to interrupt reading of the first data unit and read another data unit after which a residual portion of the first data unit is read, wherein when the amount of data has been enlarged to the limit of the capacity of the storage means when the first data unit is being read from the disc-shape recording medium, the control means subjects total time which is taken when the first and the other data units are read in a predetermined order and total time which is taken when reading of the first data unit is interrupted and reading of the other data unit is first performed after which the residual portion of the first data unit is read to a comparison so as to switch the mode to the second mode when the total time which is taken when the data units are read in the predetermined order is longer than the other total time and switch the mode to the first mode when the total time which is taken when the data units are read in the predetermined order is not longer than the other total time.

In the data reading apparatus according to the present invention, when an amount of data has been enlarged to a limit of the capacity of the storage means during reading of a first data unit, total time which is taken when the first data unit and other data units are read in a predetermined order and total time which is taken when reading of the first data unit is interrupted and reading of the other file is first performed after which a residual portion of the first data unit are subject to a comparison. When the total time which is taken when the data units are read in the predetermined order is longer than the other total time, the mode is switched to the second mode. When the total time which is taken when the data units are read in the predetermined order is not longer, the mode is switched to the first mode. The data units may be record data units, such as ECC block sectors, files, program units, a plurality of record data units or a plurality of program units, which are recorded on a disc-shape recording medium.

According to another aspect of the present invention, there is provided a data reading method such that a plurality of data unit recorded on a disc-shape recording medium are read by reading means, the data reading method including the steps of: storing data units supplied from the reading means at a predetermined rate; subjecting total time which is taken when first and another data units are read in a predetermined order and total time which is taken when reading of the first data unit is interrupted and reading of the other data unit is first performed after which the residual portion of the first data unit is read to a comparison when an amount of data has been enlarged to the limit of the capacity of storage means when the first data unit is being read from the disc-shape recording medium; switching the mode to an operation mode for controlling the reading means to interrupt reading of the first data and read another data unit after which a residual portion of the first data unit is read when total time which is taken when the data units are read in the predetermined order is longer than the other total time and switching the mode to an operation mode for intermittently limiting reading of data which is performed by the reading means when the total time which is taken when the data units are read in the predetermined order is not longer than the other total time.

With the data reading method according to the present invention, when an amount of data has been enlarged to a limit of the capacity of the storage means during reading of a first data unit, total time which is taken when the first data unit and other data units are read in a predetermined order and total time which is taken when reading of the first data unit is interrupted and reading of the other file is first performed after which a residual portion of the first data unit are subject to a comparison. When the total time which is taken when the data units are read in the predetermined order is longer than the other total time, the mode is switched to an operation mode for interrupting reading of the first data unit and reading of the other data unit is performed after which the residual portion of the first data unit is read. When the total time which is taken when the data units are read in the predetermined order is not longer than the other total time, the mode is switched to an operation mode for controlling reading of the data units which is performed by the reading means to intermittently be limited. The data units may be record data units, such as ECC block sectors, files, program units, a plurality of record data units or a plurality of program units, which are recorded on a disc-shape recording medium.

Other objects, features and advantages of the invention will be evident from the following detailed description of the preferred embodiments described in conjunction with the attached drawings.

DESCRIPTION OF THE PREFERRED EMBODIMENTS

An embodiment of the present invention will now be described with reference to the drawings.

Figure 1:
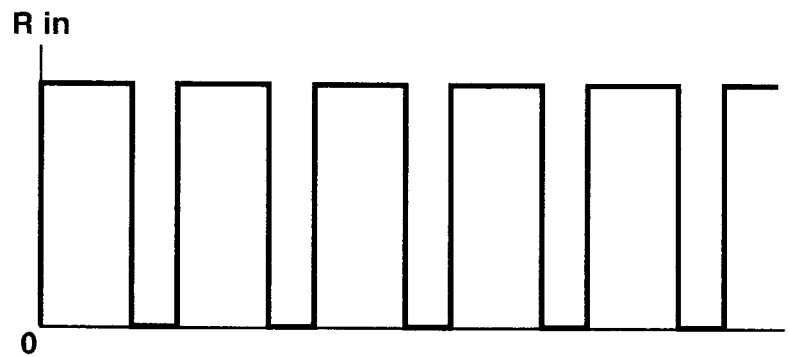
FIG. 1 is a graph showing an input rate set to a buffer memory.
Figure 2:
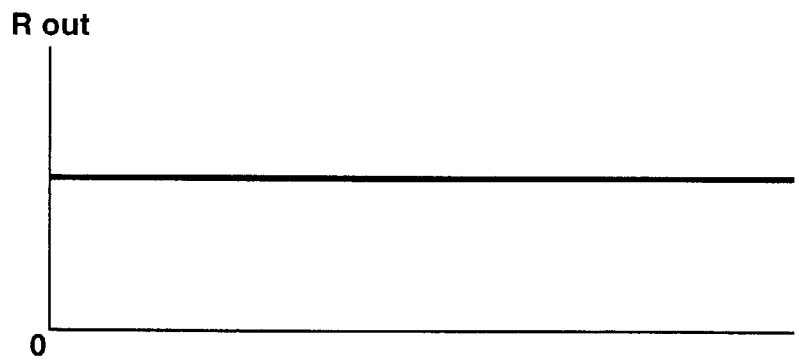
FIG. 2 is a graph showing an output rate set to the buffer memory.
Figure 3:
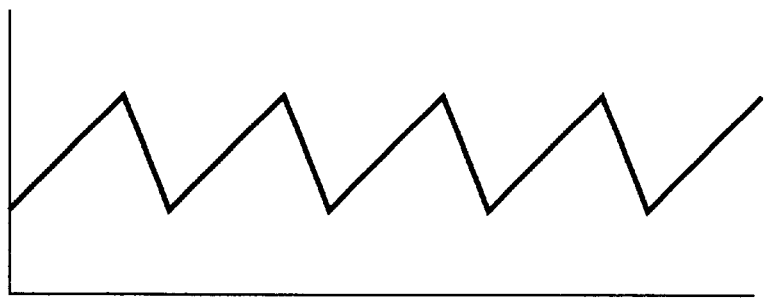
FIG. 3 is a graph showing transition of an amount of data which is accumulated in the buffer memory.
Figure 4:
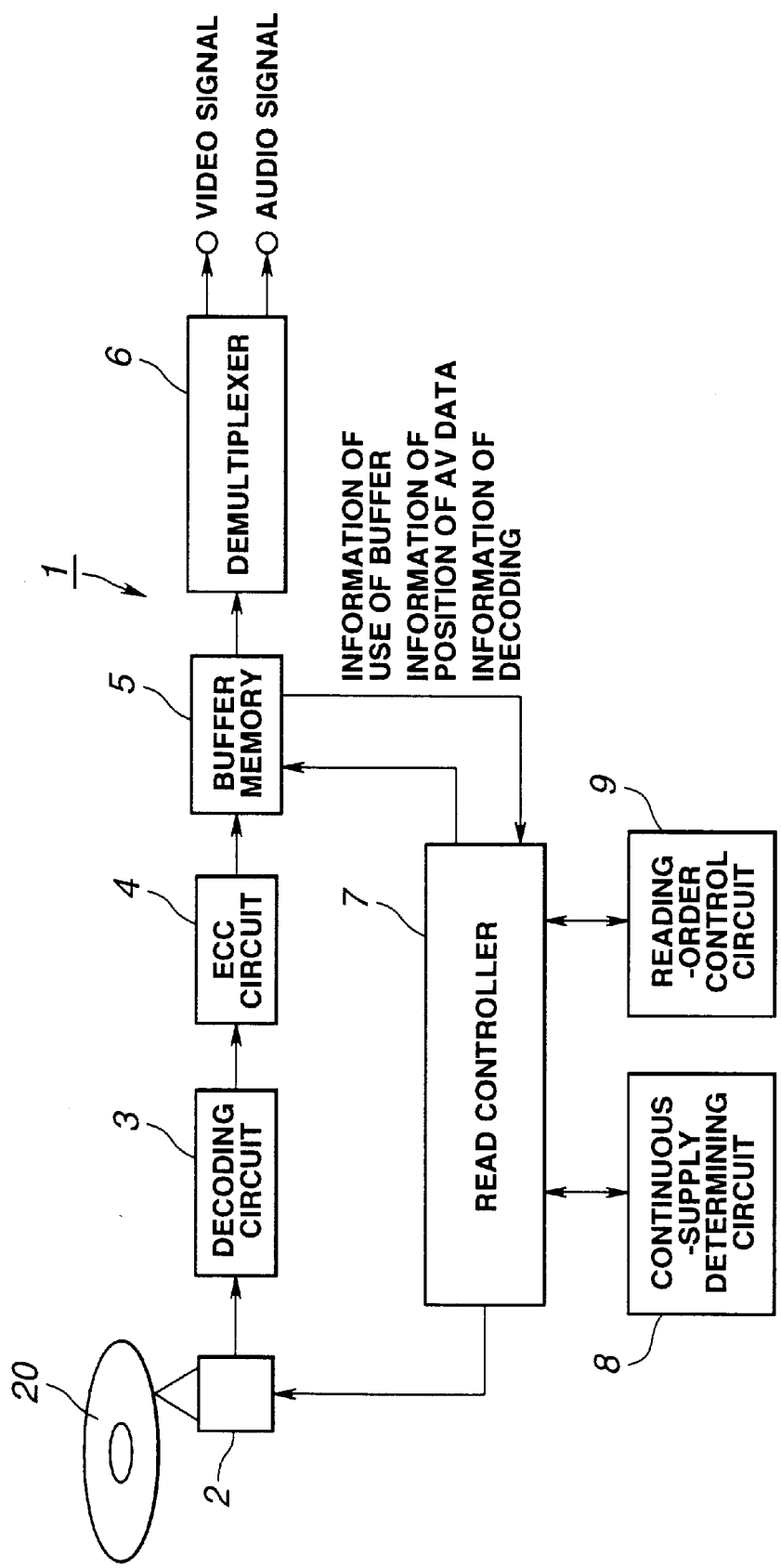
FIG. 4 is a block diagram showing a schematic structure of an apparatus for reproducing an optical disc to which the present invention has been applied.

The present invention is applied to an apparatus 1 for reproducing an optical disc having a structure, for example, as shown in FIG. 4.

The apparatus 1 for reproducing an optical disc incorporates an optical head 2 for reading data recorded on an optical disc 20; a decoding circuit 3 for decoding read data; an ECC circuit 4 for correcting an error; a buffer memory 5 in which data, the error of which has been corrected, is stored; a multiplexer 6 for dividing data read from the buffer memory 5 into a video signal and an audio signal; a read controller 7 for controlling the operation of the optical head 2 for reading data and the operation for reading data from the buffer memory 5; a continuous-supply determining circuit 8 for determining whether or not read data can continuously be supplied to the buffer memory 5; and a reading-order control circuit 9 for controlling the reading order of a plurality of files recorded on the optical disc 20.

Data composed of a plurality of files is recorded on the optical disc 20. The optical head 2 is controlled by the read controller 7 to read the file. Note that data is read by the optical head 2 at a predetermined rate.

The buffer memory 5 is supplied with data from the ECC circuit 4 at a predetermined rate. The read controller 7 performs control to cause data stored in the buffer memory 5 to be output in a predetermined reproducing order (a file order) at a predetermined rate.

When the read controller 7 has determined that data in a limit capacity has been accumulated in accordance with a state of use of the buffer communicated from the buffer memory 5, the read controller 7 performs a kickback operation. The kickback operation is an operation for inhibiting reading of data from the optical disc 20 until an available region is created in the buffer memory 5. After an available region has been created in the buffer memory 5, data is read from the optical disc 20. Since the optical head 2 usually reads data in predetermined units (for example, ECC blocks) from the optical disc 20, the optical head 2 cannot read next data from the optical disc 20 until a region in a predetermined unit for storing data is created. Therefore, the read controller 7 causes the optical head 2 to repeatedly perform track jumps, if necessary. Thus, creation of an available region in the buffer memory 5 is waited for. The above-mentioned operation is the kickback operation.

In accordance with AV data position information and so forth supplied from the buffer memory 5 through the read controller 7, the continuous-supply determining circuit 8 calculates a basic transition function A. The basic transition function A indicates an amount of data (hereinafter called a "buffer occupancy amount) which is accumulated in the buffer memory 5 on an assumption that capacity S of the buffer memory 5 is infinite. The continuous-supply determining circuit 8 calculates data transition function B indicating an actual buffer occupancy amount in accordance with the basic transition function A. The read controller 7 controls the operation of the optical head 2 for reading data and an output from the buffer memory 5 to cause the buffer occupancy amount to be changed in accordance with the data transition function B.

The reading-order control circuit 9 determines an order which enables a plurality of files discretely recorded on the optical disc 20 to efficiently be read.

Figure 5:
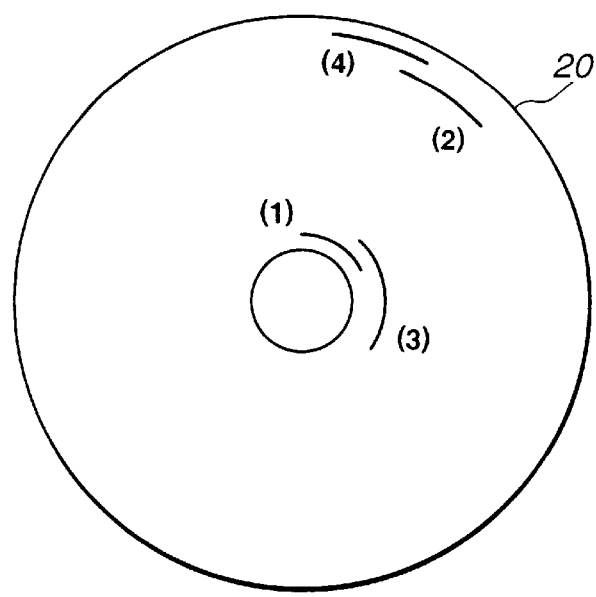
FIG. 5 is a diagram showing positions at which files recorded on an optical disc are recorded.
Figure 6:
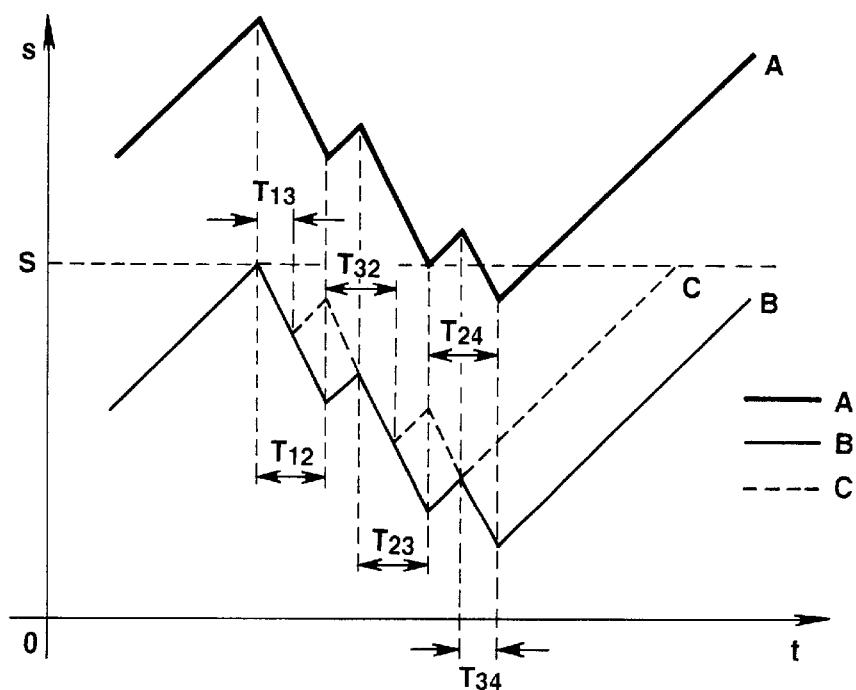
FIG. 6 is a graph showing the relationship among basic transition function A indicating a buffer occupancy amount on an assumption that the capacity of the buffer memory is infinite, data transition function B indicating an actual buffer occupancy amount and data transition function C indicating a buffer occupancy amount when the track jump time has been shortened.

An assumption is made that files (1) to (4), for example, as shown in FIG. 5, have been recorded on the optical disc 20. The basic transition function A indicating the buffer occupancy amount realized on an assumption that the capacity S of the buffer memory 5 is infinite is shown in FIG. 6.

The gradient of the basic transition function A is input/output rate Rin–Rout obtained by subtracting output rate Rout from input rate Rin of the buffer memory 5. An assumption is made that the input rate Rin and the output rate Rout are constant. When the gradient of the basic transition function A is negative, the input rate Rin=0. The data transition function B obtained by the continuous-supply determining circuit 8 in accordance with the basic transition function A and indicating the buffer occupancy amount is expressed as shown in FIG. 6.

Figure 7:
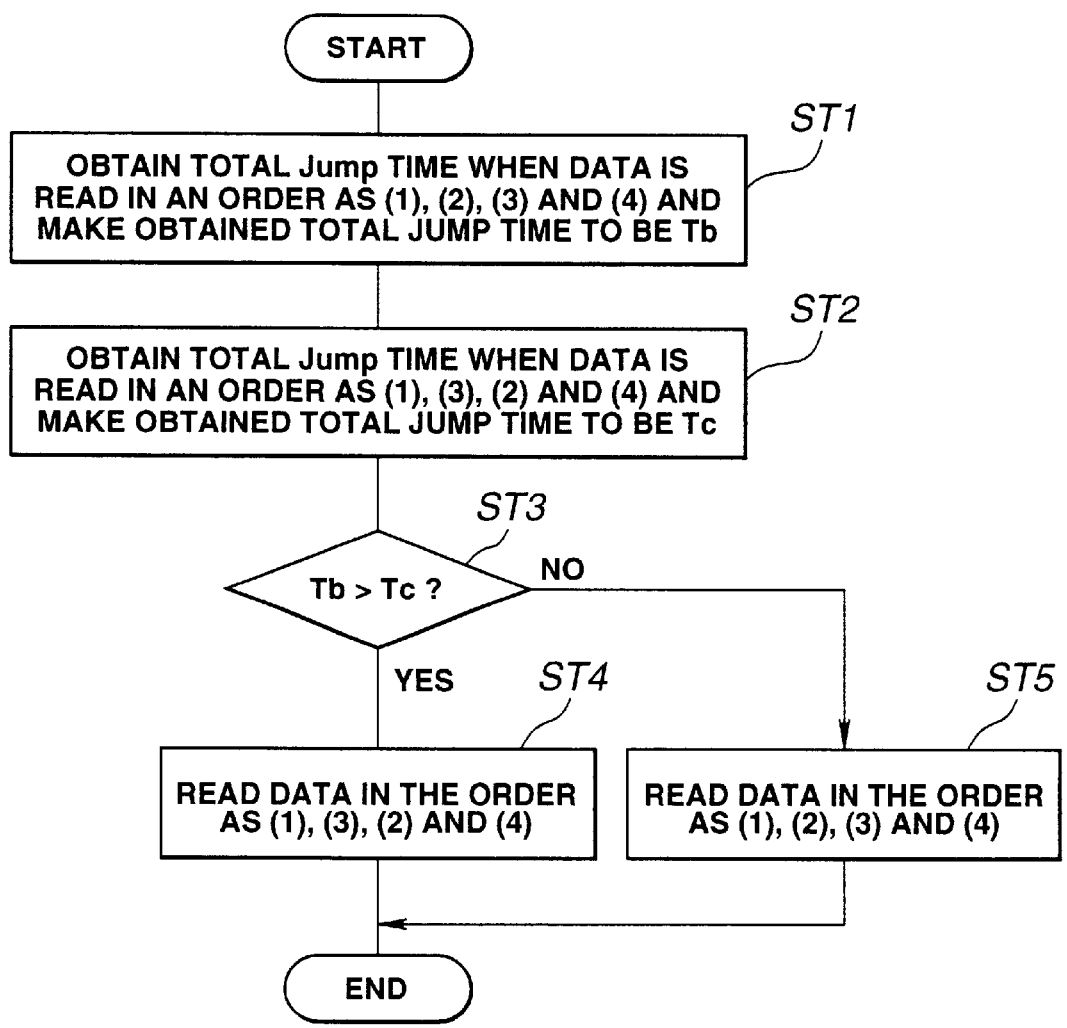
FIG. 7 is a flow chart showing the operation of a reading-order control circuit of the apparatus for reproducing an optical disc.

Specifically, the reading-order control circuit 9 performs processes in step ST1 and following steps shown in FIG. 7 so as to determine efficient reading of data.

In step ST1 the reading-order control circuit 9 obtains total jump time $T_b$ taken when data is read from the optical disc 20 in an order as files (1), (2), (3) and (4). Then, the operation proceeds to step ST2. Assuming that periods of jump time from the file (1) to the file (2), that from the file (2) to the file (3) and that from the file (3) to the file (4) are $T_{12}$, $T_{23}$ and $T_{34}$, respectively, the total jump time $T_b = T_{12} + T_{23} + T_{34}$.

In step ST2 the reading-order control circuit 9 calculates total jump time $T_c$ taken when data is read from the optical disc 20 in an order as the files (1), (3), (2) and (4). Then, the operation proceeds to step ST3. Assuming that periods of jump time from the file (1) to the file (3), that from the file (3) to the file (2) and that from the file (2) to the file (4) are $T_{13}$, $T_{32}$ and $T_{24}$, the total jump time $T_c = T_{13} + T_{32} + T_{24}$.

In step ST3 whether or not the total jump time $T_b$ is longer than $T_c$ is determined. If an affirmative determination is made, the operation proceeds to step ST4. If a negative determination is made, the operation proceeds to ST5.

In step ST4 the read controller 7 controls the optical head 2 so that data is read from the optical disc 20 in an order as the files (1), (3), (2) and (4) in accordance with a result of determination performed by the reading-order control circuit 9.

In step ST5 the read controller 7 follows a result of the determination performed by the reading-order control circuit 9 to control the optical head 2 so that data is read from the optical disc 20 in an order as the files (1), (2), (3) and (4).

As described above, the read controller 7 is able to read data from the optical disc 20 in such a manner that the jump time is made to be shortest in accordance with a result of the determination performed by the reading-order control circuit 9.

Figure 8:
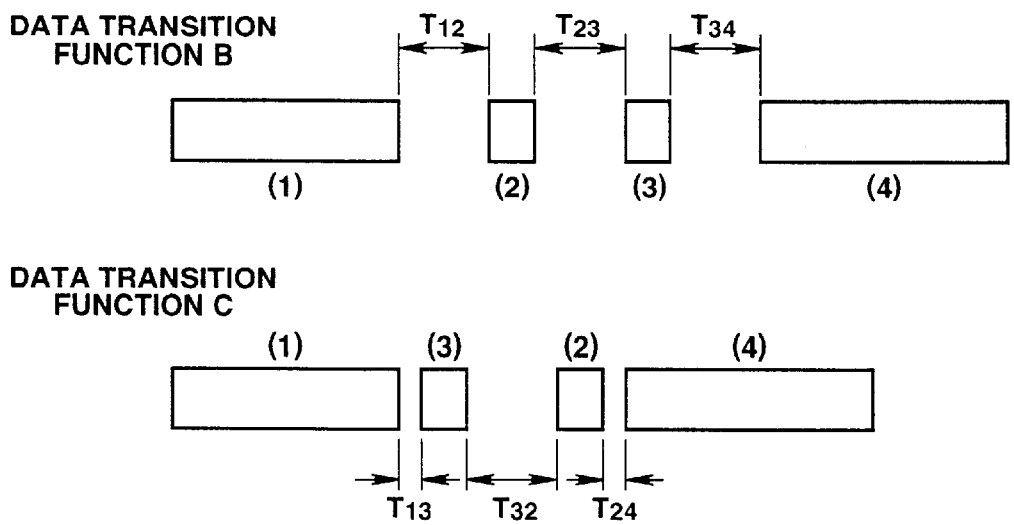
FIG. 8 is a diagram showing an amount of data which is read by an optical head when the data transition functions are B and C.

If the files are positioned as shown in FIG. 5, track jumps from the file (1) to the file (2), that from the file (2) to the file (3) and that from the file (3) to the file (4) are jumps between the innermost track of the optical disc 20 to the outermost track of the same. Therefore, time intervals $T_{12}$, $T_{23}$ and $T_{34}$ are relatively long. In particular, the foregoing phenomenon is conspicuous in a CLV (Constant Line Velocity) system. When data is read in the order as the files (1), (3), (2) and (4), the amount of data which is read by the optical head 2 is changed as indicated by data transition function C shown in FIG. 6. At this time, time $T_{32}$ is the same as time $T_{23}$, as shown in FIG. 8. On the other hand, periods of time $T_{13}$ and $T_{24}$ are shorter than periods of time $T_{12}$ and $T_{34}$. Therefore, data can quickly be read correspondingly. That is, the time taken to read data can significantly be shortened as compared with an operation for reading data in the usual order.

The reading-order control circuit 9 may obtain all of permutations (24 orders=4×3×2×1) of the four files in place of performing steps ST1 and ST2 to calculate the total jump time of the permutations. At this time, the read controller 7 is required to read the files in accordance with the permutation with which the jump time is made shortest. As a result, time required to read the files can be shortened and a required data process can quickly be completed.

A method of shortening the kickback time will now be described.

When data has been accumulated in the buffer memory 5 to the limit for the capacity S of the buffer memory 5, the read controller 7 performs the above-mentioned kickback operation to intermittently limit data which is input to the buffer memory 5. Note that data in each of predetermined units is supplied to the buffer memory 5. Data in each predetermined unit is called AE (Allocation Extent).

Figure 9:
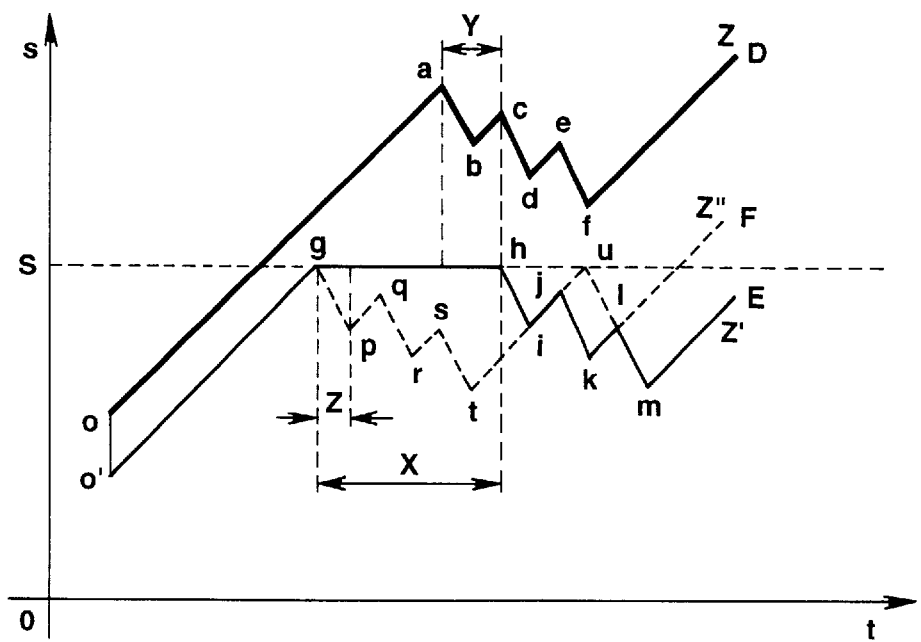
FIG. 9 is a graph showing the relationship among basic transition function D indicating a buffer occupancy amount on an assumption that the capacity of the buffer memory is infinite, data transition function E indicating an actual buffer occupancy amount and data transition function F indicating a buffer occupancy amount when the kickback operation time has been shortened.

A process will now be considered when four files are read from the optical disc 20 in accordance with basic transition function D indicating the relationship between the buffer occupancy amount and time, for example, as shown in FIG. 9. The actual buffer occupancy amount is changed as indicated by data transition function E.

In accordance with the data transition function D, file (5) is read between o and a, file (6) is read between b and c, file (7) is read between d and e and file (8) is read between f and z. An amount of data in each file which is read by the optical head 2 at this time is schematically shown in FIG. 10.

In accordance with the data transition function E indicating an actual buffer occupancy amount, the file (5) is read between o' and h, the file (6) is read between i and j, the file (7) is read between k and l and the file (8) is read between m and z'. The kickback operation is performed between g and h. An amount of data in each file which is read by the optical head 2 at this time is schematically shown in FIG. 10.

Figure 10:
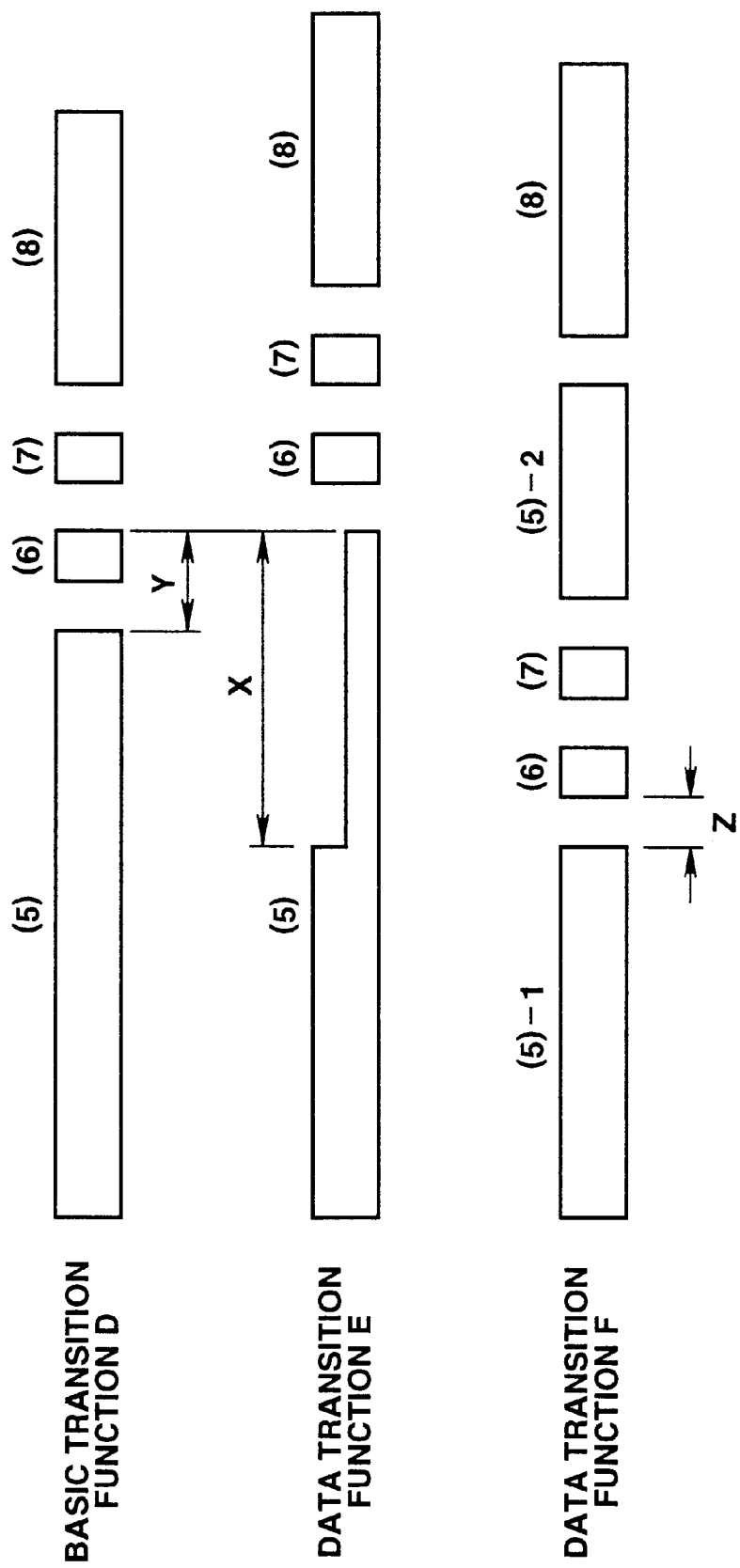
FIG. 10 is a diagram showing an amount of data which is read by the optical head when the data transition function is B and C.

Time X shown in FIG. 10 is time for which the kickback operation is performed. The amount of data which is read from the optical disc 20 at this time is smaller than that which is read when the kickback operation is not performed. If the kickback operation is performed during a period in which the file (5) is being read, waste delay of time Y occurs as compared with the basic transition function D, as shown in FIG. 10.

Therefore, the reading-order control circuit 9 is able to quickly read data by subjecting the needless delay time Y and jump time for reading the other files to a comparison and considering a result of the comparison. If the buffer occupancy amount reaches the limit during the operation for reading the file (5), the reading-order control circuit 9 performs a track jump in accordance with basic transition function F shown in FIG. 10 to read the files (6) and (7). Moreover, the reading-order control circuit 9 reads the residual file (5). Note that time Z is time for which a track jump is performed from the file (5) to the file (6).

Figure 11:
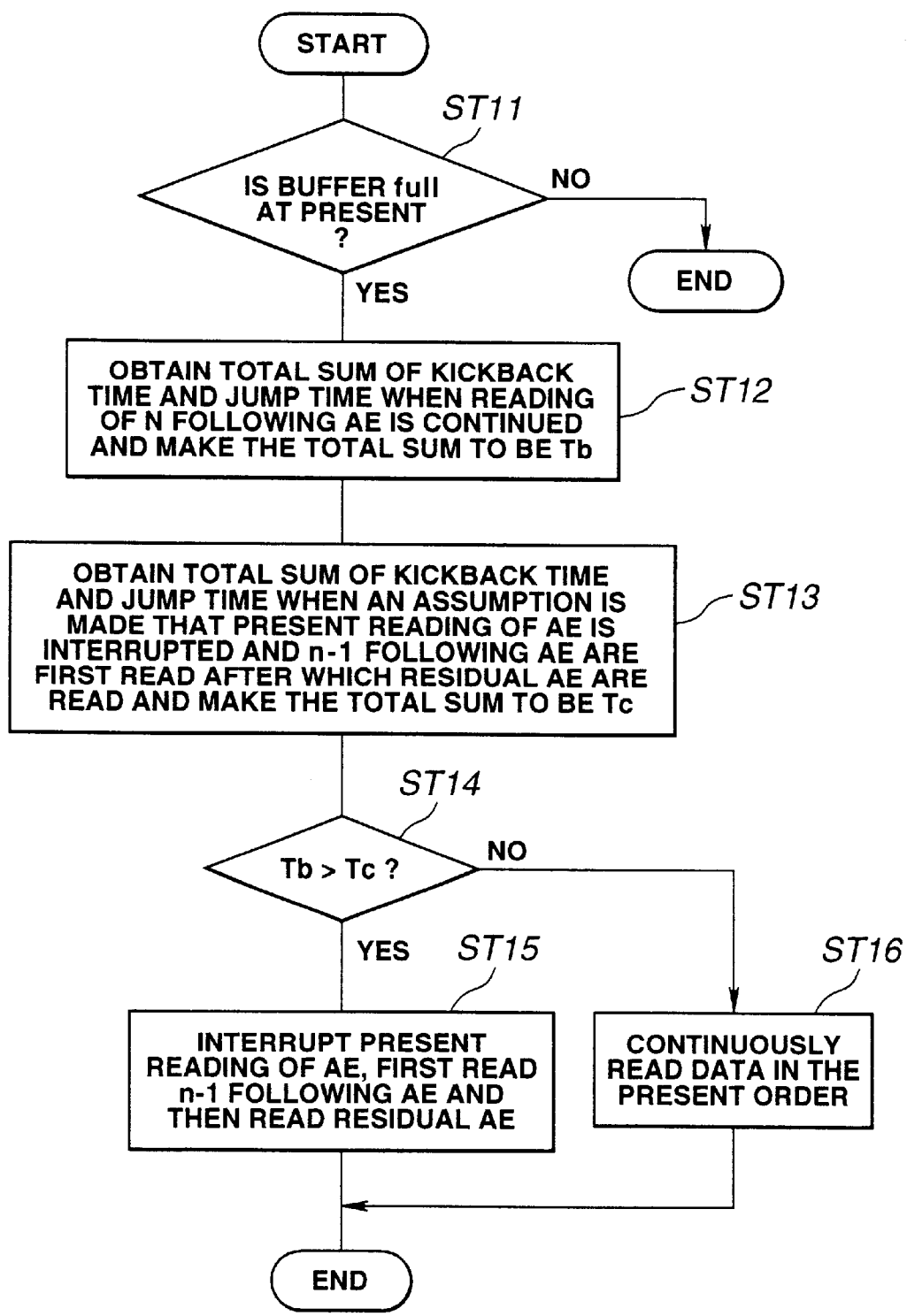
FIG. 11 is a flow chart showing the operation of the reading-order control circuit.

Specifically, the reading-order control circuit 9 performs processes in step ST11 and following steps shown in FIG. 11 to read data in AE units.

In step ST11 the reading-order control circuit 9 determines whether or not data has been accumulated to a limit (full) of the capacity S of the buffer memory 5 when data in a certain AE is being read. If data is accumulated to the limit, the operation proceeds to ST12. If data is not accumulated to the limit, the process is ended.

In step ST12 the reading-order control circuit 9 calculates total time $T_b$ including the kickback operation time and jump time when AE which is being read and n following AE are read. Then, the operation proceeds to ST13.

In step ST13 the reading-order control circuit 9 calculates total time $T_c$, such as the kickback operation time and the jump time on an assumption that the present reading of AE is interrupted. Moreover, the succeeding (n−1) AE are first read, followed by reading data in the AE of which reading has been interrupted. Then, the operation proceeds to ST14. At this time, an assumption is made that underflow of the buffer memory does not occur.

In step ST14 the reading-order control circuit 9 determines whether or not the total time $T_b$ is longer than the total time $T_c$. If an affirmative determination is made, the operation proceeds to ST15. If a negative determination is made, the operation proceeds to ST16.

In step ST15 the read controller 7 controls the optical head 2 to actually interrupt present reading of AE and first read (n−1) following AE. Then, the process is ended.

In step ST16 the read controller 7 controls the optical head 2 to read data in accordance with the present order of reading AE. Then, the process is ended.

After the processes in steps ST11 to ST16 have been performed, data can quickly be read even if the kickback operation is performed.

In a case of the data transition function E as shown in FIG. 9, AE corresponds to the files (5) to (8). When n=3, the processes in step ST11 and following steps cause the buffer occupancy amount to be changed as indicated with the data transition function F shown in FIG. 9.

In accordance with data transition function F, file (5)-1 which is a portion of the file (5) is read between o' and g, the file (6) is read between p and q, the file (7) is read between r and s, file (5)-2 which is a residual portion of the file (5) is read between t and u and the file (8) is read between l and z". In the case of the data transition function E, long waste time is caused by the kickback operation as compared with a trackjump to another file. Therefore, control is performed in accordance with the data transition function F so that a track jump is performed to another file immediately before the kickback operation is performed. Thus, the waste time can be eliminated.

As described above, the apparatus 1 for reproducing an optical disc causes the track jump time of the optical head 2 to be shortened and the kickback time to be shortened. Thus, the apparatus 1 for reproducing an optical disc is able to efficiently and quickly read data from the optical disc 20. As a result, a data processing operation in each circuit can efficiently be performed.

Note that the present invention is not limited to the above-mentioned embodiment. For example, a magnetic disc may be employed in place of the optical disc 20. A magnetic head may be employed in place of the optical head 2. The above-mentioned file may be in the form of, for example, ECC block units or sector units. The file may be in the form of program units.

As described above, the data reading apparatus and data reading method according to the present invention are structured such that track jump periods of time which are taken when the reading means reads each file in accordance with permutations of the files which can be combined are calculated. Moreover, the reading means is controlled to read the plural files in accordance with the permutation of the files with which the track jump time can be made shortest. Thus, the track jump time can be shortened to efficiently read data.

The data reading apparatus and the data reading method according to the present invention have the steps of subjecting total time which is taken when first and another data units are read in a predetermined order and total time which is taken when reading of the first data unit is interrupted and reading of the other data unit is first performed after which the residual portion of the first data unit is read to a comparison when an amount of data has been enlarged to the limit of the capacity of storage means when the first data unit is being read from the disc-shape recording medium; switching the mode to an operation mode for controlling the reading means to interrupt reading of the first data and read another data unit after which a residual portion of the first data unit is read when total time which is taken when the data units are read in the predetermined order is longer than the other total time and switching the mode to an operation mode for intermittently limiting reading of data which is performed by the reading means when the total time which is taken when the data units are read in the predetermined order is not longer than the other total time. As a result, delay time in reading data caused by the so-called kickback operation can be shortened and, therefore, data can efficiently be read.

Although the invention has been described in its preferred form and structure with a certain degree of particularity, it is understood that the present disclosure of the preferred form can be changed in the details of construction and in the combination and arrangement of parts without departing from the spirit and the scope of the invention as hereinafter claimed.

What is claimed is:

1. Method for reading data from data units recorded in different tracks of a disc shaped recording medium, comprising the steps of:

reading a first portion of a first data unit and storing the read data in a buffer;

monitoring occupancy of said buffer, and if said buffer occupancy has reached a predetermined threshold, determining whether to perform a first operation comprising a kickback operation in which the remaining portion of said first data unit is read at a slower overall rate than said first portion by intermittently reading said remaining portion, prior to reading data from any other of said data units, or a second operation comprising a first track jump to a second data unit to read data from said second data unit followed by a subsequent, second track jump back to said first data unit to read said remaining portion thereof; and controlling reading of said data units in an order according to said determination of whether to perform said first or second operation;

wherein said determination is based on anticipated time durations for said first and second track jumps and for said kickback operation, said first operation is selected when a first total reading time for reading all of said data units including at least one track jump and said kickback operation during said first operation is less than a second total reading time for reading all of said data units including track jumps in said second operation, and said second operation is selected when said second total reading time is shorter than said first total reading time.

2. Method according to claim 1 wherein when said second operation is performed, a track jump is performed to a third data unit of said data units to read data therefrom prior to said second track jump and to said reading of data from the remaining portion of said first data unit.

3. Apparatus for reading data from data units recorded in different tracks of a disc shaped recording medium, comprising:

reading means for reading data from said data units, said reading means reading a first portion of a first data unit;

a buffer for storing data read by said reading means;

monitoring and control means for monitoring occupancy of said buffer, and if said buffer occupancy has reached a predetermined threshold, determining whether to perform a first operation comprising a kickback operation in which the remaining portion of said first data unit is read at a slower overall rate than said first portion by intermittently reading said remaining portion, prior to reading data from any other of said data units, or a second operation comprising a first track jump to a second data unit to read data from said second data unit followed by a subsequent, second track jump back to said first data unit to read said remaining portion thereof;

wherein said determination of whether to perform said first or second operations is based on anticipated time durations of said first and second track jumps and for said kickback operation, said first operation is selected when a first total reading time for reading all of said data units including at least one track jump and said kickback operation during said first operation is less than a second total reading time for reading all of said data units including track jumps in said second operation, and said second operation is selected when said second total reading time is shorter than said first total reading time; and said monitoring and control means controls reading of said data units in an order according to said determination.

4. Apparatus according to claim 3 wherein when said second operation is performed, a track jump is performed to a third data unit of said data units to read data therefrom prior to said second track jump and to said reading of data from the remaining portion of said first data unit.

5. A data reading apparatus comprising:

reading means for reading a plurality of data units recorded in different tracks of a disc type recording medium;

calculation means for calculating total reading times for all possible permutations of said data units, said total reading times each including time intervals for track jumping between data units;

control means for selecting the permutation of said data units for which total reading time is the shortest and controlling said reading means to read said data units in an order of the selected permutation; and, storage means for storing the data units read by said reading means.

6. A data reading method for reading a plurality of data units recorded in different tracks of a disc type recording medium, comprising the steps of:

calculating total reading times for all possible permutations of said data units, said total reading times including time intervals for track jumping between data units;

selecting the permutation of said data units for which the total reading time is the shortest;

controlling said reading such that said data units are read in an order of the selected permutation; and storing the read data units in a buffer.

* * * * *